Aug. 29, 1961 F. W. HALL ET AL 2,998,490

TELEPHONE COIN COLLECTORS

Filed June 19, 1957 6 Sheets-Sheet 1

INVENTORS
Frederick William Hall
Andrew Young
BY Robertson and Young
ATTORNEYS

Aug. 29, 1961 F. W. HALL ET AL 2,998,490

TELEPHONE COIN COLLECTORS

Filed June 19, 1957 6 Sheets-Sheet 2

INVENTORS
Frederick William Hall
Andrew Young
BY Robertson and Goutie
ATTORNEYS

Aug. 29, 1961 F. W. HALL ET AL 2,998,490

TELEPHONE COIN COLLECTORS

Filed June 19, 1957 6 Sheets-Sheet 3

INVENTORS
Frederick William Hall
Andrew Young
BY Robertson and Youtie
ATTORNEYS

INVENTORS
Frederick William Hall
Andrew Young
BY Robertson and Vautie
ATTORNEYS

Aug. 29, 1961 F. W. HALL ET AL 2,998,490

TELEPHONE COIN COLLECTORS

Filed June 19, 1957 6 Sheets-Sheet 5

INVENTOR.
Frederick William Hall
Andrew Young
BY Robertson and Young
ATTORNEY

INVENTORS
Frederick William Hall
Andrew Young
BY Robertson and Yoeties
ATTORNEYS United States Patent Office 2,998,490

Patented Aug. 29, 1961

2,998,490

TELEPHONE COIN COLLECTORS

Frederick William Hall and Andrew Young, Willesden, London, England, assignors to Associated Automation Limited, London, England, a British company Filed June 19, 1957, Ser. No. 666,606
Claims priority, application Great Britain July 2, 1956
12 Claims. (Cl. 179—6.5)

This invention relates to a post-payment coin collector for telephones, that is, a collector in which payment is made by the caller after connection has been established with the called party. This type of coin collector is to be distinguished from the well-known "pre-payment" collector in which payment must be made before connection can be established. In other words, in a post-payment system the called party's number is obtained before coins are inserted and the act of answering by the called party may be used to cause mechanism to unlock the coin slots; for instance, the act of answering could be arranged to reverse the polarity of the lines to the caller and condition the locking mechanism to allow coin insertion.

Thus in a post-payment system a possible sequence of events would be as follows:

(1) The caller lifts his receiver and this gives him a line to the exchange. When the exchange has apparatus available (usually immediately) a tone signal, such as the familiar dialling tone, is sent back to the caller's instrument.

(2) The caller then dials his required number.

(3) The called party, by the act of answering the call, causes a change of state in the lines (as for example the polarity reversal mentioned) from the exchange to the caller's instrument. This change of state may be used to permit unlocking of the coin slots, such as by the release of slot locking mechanism.

(4) The caller then makes the appropriate payment. As explained, until the coin slots have been unlocked it is impossible for a caller to insert a coin or coins.

(5) Immediately after insertion of a coin through one of the coin slots the slot locking mechanism prevents insertion of further coins for a short time, during which various operations may take place, including coin checking, and the transmission of signal pulses to the exchange corresponding to the coin value. After this short time the slots are again operative for insertion of further coins if required. Information, such as the signal pulses mentioned, according to the coin value, is passed to the local exchange for regulation of the length of the call.

(6) When the correct payment has been made the call may proceed, the caller and called parties being already in communication.

(7) Near the end of the call period already paid for and with its duration accordingly governed from the local exchange, a warning, such as a special signal, is given to the caller to enable him to insert further coins if he wishes to prolong the call. If by the end of the call period no more coins have been inserted, then the call is terminated.

According to this invention a telephone coin collector of the post-payment type comprises a casing, a coin slot in the casing, locking means to control opening and closing of the slot, release means responsive to a control signal and operative on the locking means to permit insertion of a coin when such signal is received, and signal transmitting mechanism which transmits signals varying in accordance with the value of the inserted coin. More than one coin slot may be, and usually will be, provided. An important feature of the invention is the use of coin slot locking mechanism so that coins may only be inserted at the proper times. This prevents a caller losing money by inserting coins at the wrong time, it being understood that with a post-payment collector a coin suspense and return arrangement is not necessary.

A coin collector according to the invention may include mechanism for ensuring that correct functions are carried out. When a coin slot has been opened, and as soon as a coin has been inserted, a cycle of operations is set in motion. Controlled delay mechanism, for example a centrifugal governor-controlled delay mechanism, is put into operation, to provide a delay period for the following functions, for example, to be carried out: testing the inserted coin; signal pulsing according to the coin value; and control of associated circuits. Other functions could of course be provided for. At the end of the delay period the mechanism reverts to the open slot state, so as to permit insertion of a further coin to extend the call.

In one unit according to the invention three slots are provided, a shilling slot, a sixpenny slot and a threepenny slot. Coins of other denominations and currencies could naturally be provided for. If a shilling is inserted the mechanism is adapted to send to the exchange a number of pulses corresponding to a shilling, for instance 4 pulses, and mechanism at the exchange then allows a call period appropriate to the value of a shilling. If a sixpence is inserted the mechanism is adapted to send to the exchange a number of pulses corresponding to sixpence, for instance 2 pulses, and likewise 1 pulse is sent on the insertion of a threepenny piece.

One embodiment of a post-payment telephone coin collector will now be described in more detail as an example of the invention, with reference to the accompanying drawings in which.

Figure 2:
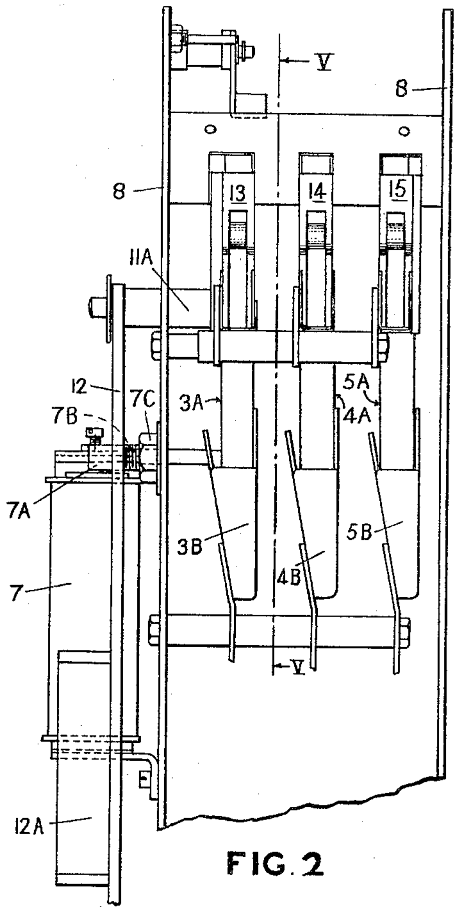
FIGURE 2 is a front elevation, with the cover and coin slots removed, of the upper part of the mechanism.
Figure 4:
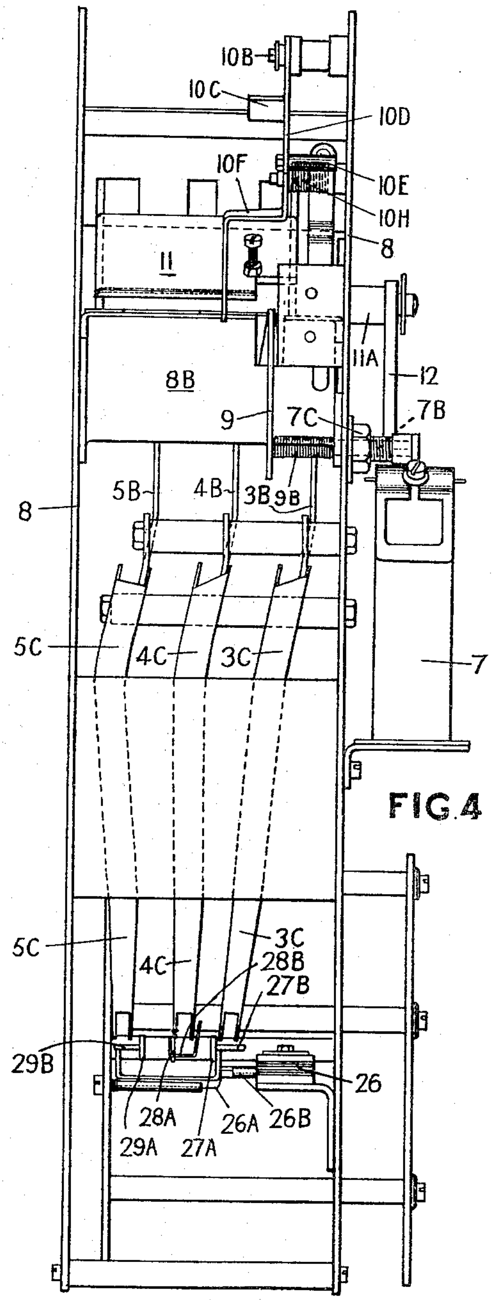
FIGURE 4 is a rear elevation, with some parts omitted.

Referring to the drawings, the coin collector shown is in two main parts, the upper part seen generally in FIGURES 2 and 4, including coin slots, coin levers, coin slot locking mechanism and coin testing means. The lower part, seen generally in FIGURES 4 and 8, includes governor-controlled delay and pulsing mechanism.

Stated in outline, operation is as follows: After a connection between the caller and the called party has been established, a signal reaches the coin collector, which signal may have been produced by, for instance, reversal of polarity in the line when the called party answers. The signal operates a slot unlocking relay which moves a lever to unlock those parts directly operable by a coin on insertion. Whenever a coin is inserted the mechanism is taken through its full cycle of operations. Insertion of a coin moves one pivoted coin lever (there being three coin levers) upwardly about its pivot and that coin lever lifts a carriage or yoke, common to all three coin levers. This common carriage lifts a weighted driving arm extending downwardly to the lower mechanism, the driving arm being connected to an arcuately movable radius arm which actuates a gear train for moving governor-controlled mechanism and for operating a pulsing disc and associated mechanism. When the coin has been inserted and the appropriate coin lever, with the carriage and driving arm, have been raised, the coin passes to coin testing mechanism, which will reject an unsuitable coin. At the same time the weighted driving arm will descend and set in motion the gear train and the governor, which controls the speed of descent of the arm and consequently the speed of rotation of the pulsing disc. The pulsing disc is fixed on what may be termed a pulsing shaft, and revolution of this shaft is controlled by a one revolution clutch, so that rotation of the pulsing shaft, by the weighted arm, is limited to a 360° movement for each coin insertion. After a coin has passed through the coin testing mechanism it falls and depresses a masking lever for opening a masking contact which in its normal closed state shorts a pulsing contact and renders pulsing ineffective so determining the number of pulses transmitted, according to the coin value. There are three masking levers, one for each coin value. A depressed masking lever returns to normal after a time duration which depends on the coin value for the masking lever in question. Thus the masking lever operated by a threepenny piece causes the masking contact to short out the pulsing contact after transmission of one pulse. On the other hand the masking lever operated by a sixpence causes the pulsing contact to be shorted by the masking contact after transmission of two pulses. The shilling-operated masking lever only shorts out the pulsing contact after all four pulses have been transmitted.

Depressed masking levers are permitted to return upwardly to normal position by trip levers, operated at the appropriate moments according to the coin value, by the governor-controlled mechanism.

During pulsing two off normal contacts shield the handset from serious click noises which might be caused by pulsing.

Figure 1:
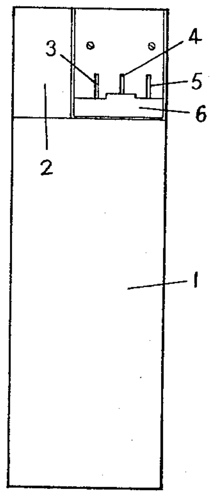
FIGURE 1 is a front elevation of the coin collector with its cover in position.

Referring now to FIGURE 1, a housing 1 has a sloping face 2 with coin slots 3, 4 and 5 for shillings, sixpences and threepenny pieces respectively. These denominations of coin are given by way of example. Clearly the coin collector could be constructed to operate with other coin denominations, and with different currencies, according to the country in which the collector is to be used.

A stepped plate 6 reinforces the lower edge of each slot and also ensures that the correct direction of movement is imparted to a coin, as it passes through its slot, for operating its coin lever.

Figure 3:
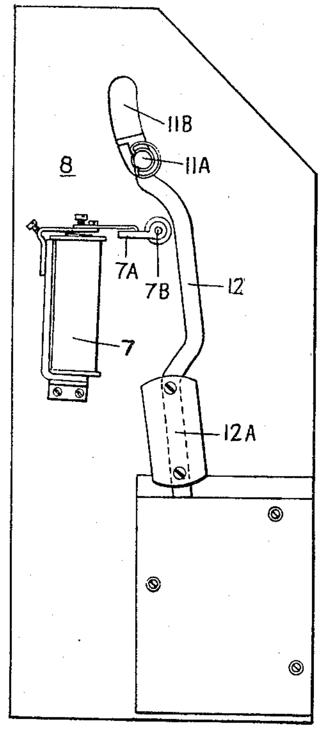
FIGURE 3 is a side elevation, as seen from the left-hand side.

Referring to FIGURES 2, 3 and 4, a slot unlocking relay 7, on energisation as a result of, for instance, the previously mentioned reversal of polarity, depresses an arm 7A fixed on a short shaft 7B, pivotally mounted at 7C in the frame 8 of the apparatus. At its other end the shaft 7B (FIGURE 5) carries a locking lever 9 having a nose 9A. On energisation of the relay 7 the lever 9 unlocks by rearward pivotal movement on the shaft 7B, against a coil spring 9B, which returns the locking lever 9 to locking position when the relay 7 is no longer energised.

Figure 5:
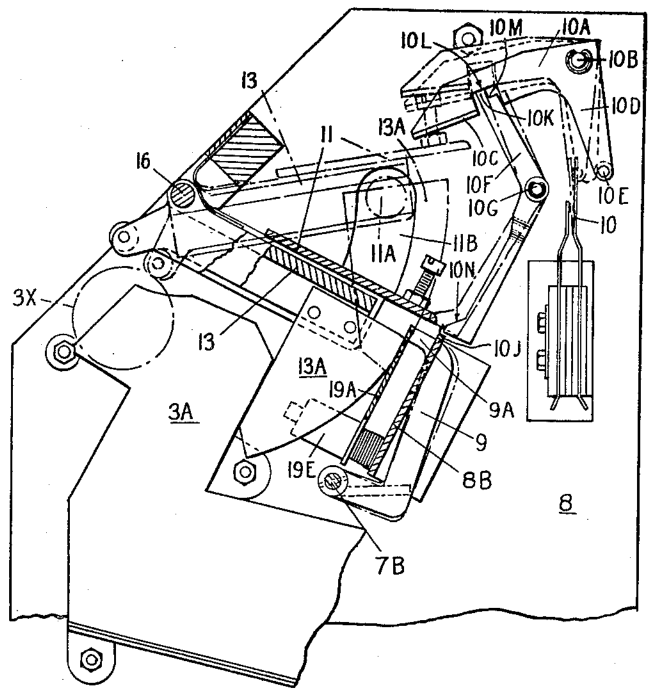
FIGURE 5 is a section on the line V—V of FIGURE 2 to an enlarged scale.

As will be described, the locking lever 9 controls movement of the coin levers and the carriage, but it will be as well to interpolate here a description of a contact 10 which controls the slot unlocking relay 7. This relay control contact 10 is normally open, but it is closed to short out the relay 7 whilst the coin carriage and the weighted arm are descending, so as to prevent unauthorised manipulation of a coin lever, by partial insertion for instance of another coin, for sending additional pulses back through the lines. The mechanism concerned is shown in FIGURE 5. A crank 10A is pivotally mounted at 10B to the frame 8. As the carriage 11 is raised to its full extent it engages and lifts the end 10C of the crank 10A and so causes the other end 10D, carrying a contact-closing finger 10E, to move forward and close the contact 10. A trip lever 10F is pivotally mounted on a shaft 10G on the frame 8 and a spring 10H is coiled on the shaft 10G, which spring urges a nose 10J at the lower end of the trip lever forwardly and the stepped upper end 10K rearwardly. When the carriage raises the crank end 10C, the end 10K is partly released from a detent 10L in the crank and assumes the dotted line position, holding the crank by a step 10M and so keeping the contact 10 closed. When the carriage 11 descends, it engages a sloping edge 10N on the nose 10J and pushes the latter rearwardly, moving the step 10M forwardly and permitting the crank to return to normal position, so that the contact 10 opens. Thus the contact 10 shorts out the slot unlocking relay whilst the delay period obtains, that is, whilst the carriage 11 and weighted arm 12 are descending.

Returning now to movement of coin levers 13, 14 and 15 (FIGURE 2) and the carriage 11, controlled by locking lever 9: on insertion of, say, a shilling in the slot 3 the coin lever 13, rockably mounted on a shaft 16 (FIGURE 5) carried in the frame 8, is raised arcuately about that shaft. The position of the shilling just as it has raised the coin lever 13 (see dotted lines) is indicated by 3*x*. The coin lever 13 raises the carriage 11, rockably mounted on the shaft 16. A lateral extension 11A of the carriage is connected to the upper end of the weighted driving arm 12 (which has a weight 12A fixed to it) through a curved slot 11B in the frame 8 (see FIGURE 3). The weight 12A is sufficient to cause the arm 12 to drive the governor-controlled delay and pulsing mechanism as the arm is descending.

Figures 6, 7:
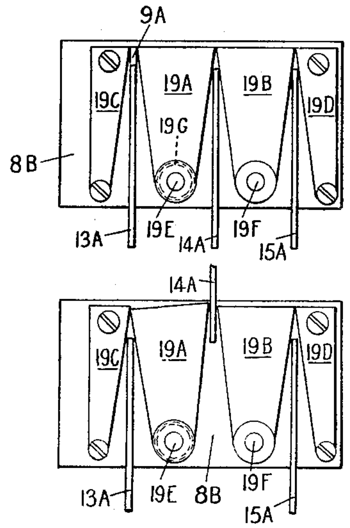
FIGURES 6 and 7 are detail front elevations of locking sectors, showing two positions.

It is important that it should only be possible to insert one coin into the apparatus at a time; in other words whilst a shilling is being inserted in slot 3, a sixpence cannot be inserted in slot 4 nor a threepenny piece in slot 5. Means are provided to ensure this single coin insertion, as follows. From the rear end of each coin lever 13, 14 or 15, there depend pivotally hung blades 13A, 14A or 15A (see FIGURES 5, 6 and 7) which are positioned to engage in a gap which can appear between movable locking sectors 19A and 19B and fixed locking sectors 19C and 19D. This gap is able to receive any one of the blades 13A, 14A or 15A. The movable locking sectors 19A and 19B are pivotally mounted at 19E and 19F for slight lateral swinging movement on a subframe 8B. The sectors 19C and 19D are fixed to that sub-frame. The four sectors are so arranged that only the one gap may appear, although it may appear in different places. This has the result that only one of the blades 13A, 14A or 15A may enter the gap at a time, and this in turn means that only one coin lever may be raised at a time. FIGURE 7 shows the blade 14A in the gap, which in this instance is between sectors 19A and 19B. That would be the situation on insertion of a sixpence, whilst the coin lever is raised.

Relay 7 is then de-energised and when the coin lever 14 and its blade 14A descend the sector 19A, urged by a spring 19G coiled on the pivotal mounting 19E, is turned clockwise (as seen in FIGURE 6) and the nose 9A enters the gap, the lever 9 being urged to that position by the spring 9B.

The locking lever 9 has the nose 9A which in the locked state (see FIGURE 6 and as just mentioned) is positioned betwen sectors 19C and 19A. This prevents movement of the locking sectors and so prevents movement of the coin levers 14 and 15, and also prevents movement of the coin lever 13 by direct abutment of the blade 13A beneath the nose 9A. Thus the slots are locked when the lever 9 is not withdrawn by the relay 7.

In FIGURE 2 are shown coin passages 3A, 4A and 5A into which the coins pass from the slots 3, 4 and 5. These passages include rearwardly directed coin-testing sections 3B, 4B and 5B and downwardly directed sections 3C, 4C and 5C (see FIGURE 4). Below the sections 3C, 4C and 5C may be seen the coin-actuated masking levers, which will be described separately.

Figure 8:
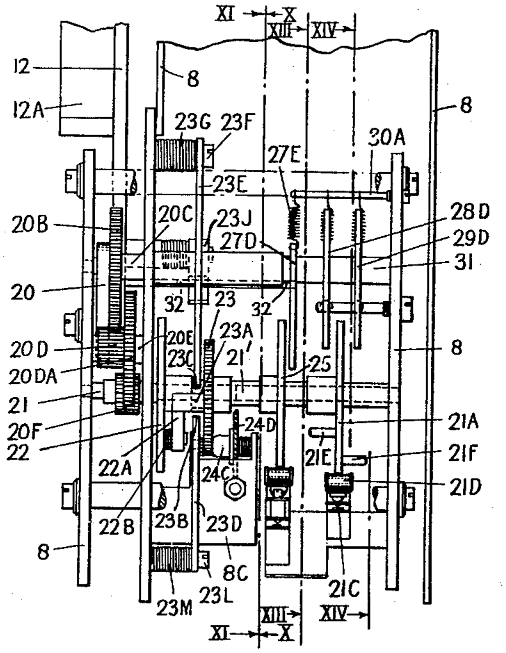
FIGURE 8 is a front elevation of the lower part of the mechanism.
Figure 9:
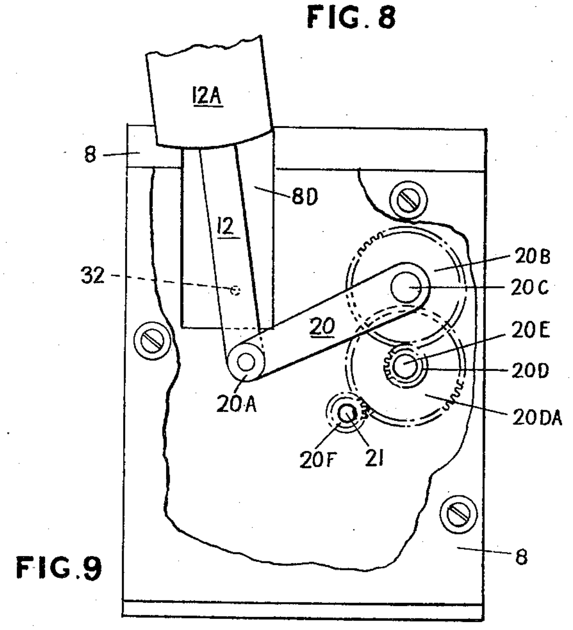
FIGURE 9 is a detail side elevation, partly broken away, to reveal a gear train.

The governor-controlled delay mechanism will now be described. In FIGURES 8 and 9 the gear train may be seen. It includes a radius arm 20 pivotally carried at 20C and linked at 20A on the lower end of the arm 12. The radius arm 20 is fixed to a gear wheel 20B mounted on a shaft 20C and the gear wheel 20B meshes with a pinion 20D fixed to a gear wheel 20DA on a shaft 20E. In turn the gear wheel 20DA meshes with a pinion 20F fixed to a shaft 21. Thus when the weighted arm descends the pinion 20F rotates.

Figure 10:
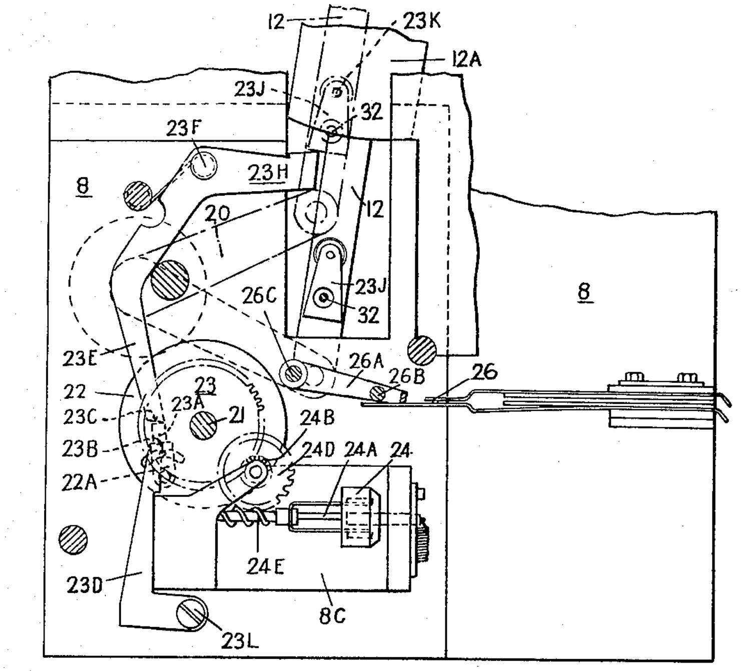
FIGURE 10 is a section on line X—X of FIGURE 8, looking in the direction of the arrows.

Also fixed to the shaft 21 is a one-revolution clutch disc 22 which consequently rotates with the pinion 20F. This disc 22 carries a spring-pressed pawl 22A pivotally mounted at 22B, and the pawl 22A is arranged to abut a projection 23A on a gear wheel 23 which is fixed to a pulsing shaft $21^1$ and in fact drives the latter. The shafts 21 and $21^1$ are in line but can move independently, being separated between the disc 22 and the gear wheel 23. The pulsing shaft $21^1$ is arranged to bear inside the shaft 21. It will be noted that the projection 23A, as seen in FIGURES 8 and 10, is between the adjacent ends 23B and 23C of respectively forward stop and back stop locking levers 23D and 23E which prevent rotation of the gear wheel 23, and consequently prevent pulsing, except when the disc 22 is rotated by the driving arm 12, and ensure accurate starting and stopping. The locking lever 23E takes the form of a bell crank pivoted to the frame 8 on a pivot post 23F and urged to the locking position by a coil spring 23G about the pivot post 23F, the upper component 23H being engageable by a spring-pressed catch 23J carried by the arm 12 on a post 23K, and working in a cut-out 8D of the frame. As the arm 12 descends the catch 23J momentarily depresses the bell-crank component 23H to move the locking lever 23E from the path of the projection 23A. The locking lever 23D is pivotally mounted on a post 23L about which is a coil spring 23M normally urging the lever 23E to locking position but permitting the projection 23A to displace the projection as the gear wheel 23 completes its revolution. The locking lever 23D is returned to locking position by the spring 23M immediately the projection 23A has passed into its rest position.

Referring to FIGURES 8 and 10, a centrifugal governor 24 on a shaft 24A mounted in a sub-frame 8C is driven from the gear wheel 23. The latter drives a pinion 24B on a shaft 24C which also carries a wheel 24D driving a worm 24E on the governor shaft 24A. Since the governor is in this way connected into the pulsing drive, the movement of the weighted arm 12 and all associated mechanism is controlled by the governor so that the pulsing mechanism operates for a definite time.

Figures 12, 13:
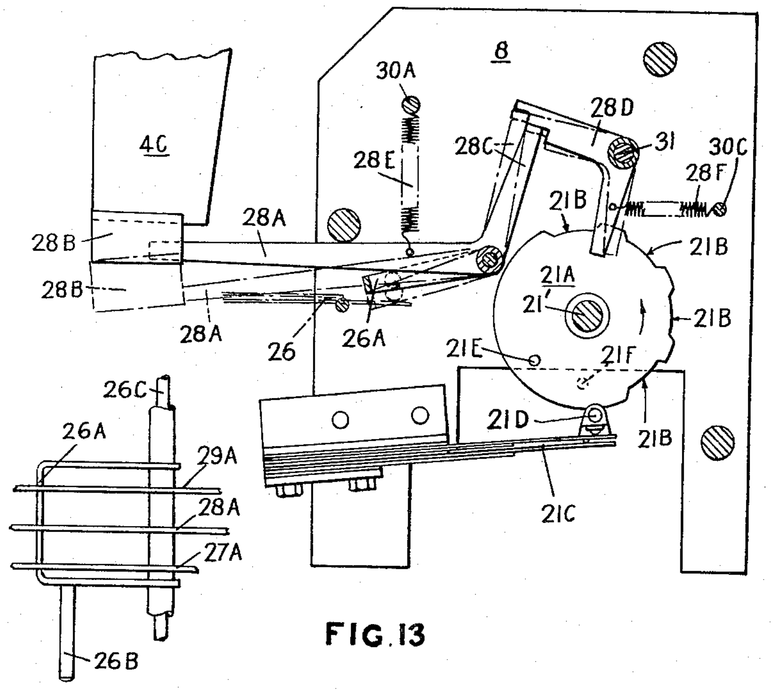
FIGURE 12 is a detail in plan of a masking carriage and lever.
FIGURE 13 is a detail section on line XIII—XIII in FIGURE 8, showing a pulsing disc and other parts.

A pulsing disc 21A is fixed on the pulsing shaft $21^1$ (see FIGURES 8 and 13) and its periphery includes four depressions 21B. A pulsing contact 21C is normally closed but opens each time its rider 21D rides in one of the depressions. In this way four pulses are transmitted to the local exchange during one revolution of the pulsing disc. It will be noted that the pulsing disc has laterally, oppositely projecting pins 21E and 21F. Their purpose will be explained later.

Figure 11:
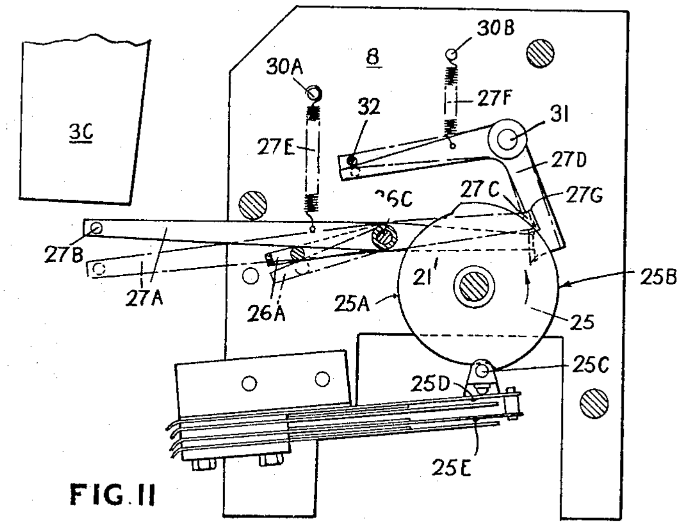
FIGURE 11 is a section on line XI—XI of FIGURE 8, looking in the direction of the arrows.

Also fixed on the pulsing shaft $21^1$ is an "off normal" disc 25 (see FIGURES 8 and 11) whose periphery includes a normal run 25A and a raised run 25B, the periphery engaging a rider 25C of twin contacts 25D and 25E. These are the "off normal" contacts; they are operated in unison. Their purpose is to shield the handset from serious click noises caused by the pulsing. They are closed whilst pulsing takes place, thus shorting out temporarily the handset. The raised run 25B, synchronized with the four depresions 21B in the pulsing disc, depresses the rider 25C to close the twin contacts 25D and 25E whilst pulsing takes place.

Figure 14:
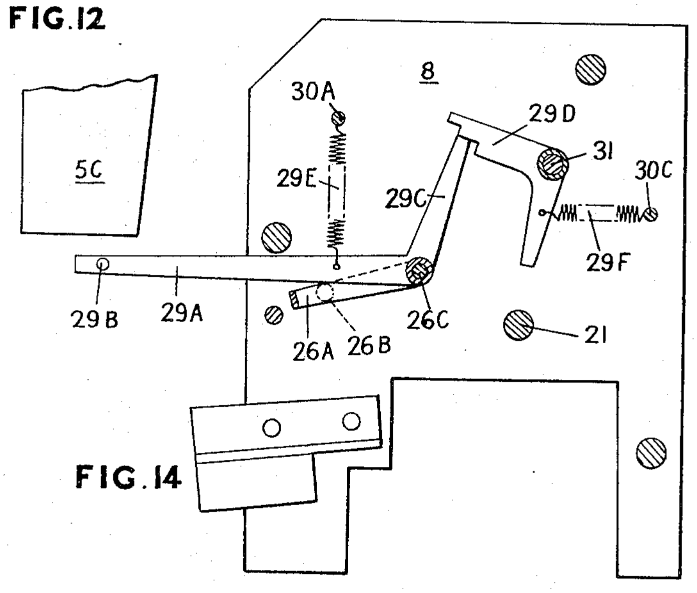
FIGURE 14 is a detail section on the line XIV—XIV of FIGURE 8, showing the threepenny masking and trip levers.

The masking contact 26 is seen in FIGURES 4 and 10. As explained, its purpose is to mask some of the pulses so that only those are effective which accord with the coin value. The contact 26 is normally closed, to short out the pulsing contact, but it is opened for a sufficient length of time according to the number of pulses to be transmitted. It is opened by depression of a carriage 26A (see also FIGURES 12 and 14), with a lateral extension 26B engaging the contact 26, the carriage 26A being rotatably carried on a shaft 26C extending across the frame. On this shaft 26C coin-actuated masking levers 27A, 28A and 29A (for shillings, sixpences and threepenny pieces respectively) are rockably mounted, the rear ends of these levers having abutments 27B, 28B and 29B positioned in the respective coin paths below the sections 3C, 4C and 5C of the coin passages. It will be realised that if a coin is defective and rejected by the testing means, it will not reach nor actuate a masking lever, so that the pulsing contact will remain shorted and ineffective.

The masking levers (see FIGURES 11, 13 and 14) have forward ends 27C, 28C and 29C, each engageable with trip levers 27D, 28D and 29D, and further the masking levers are normally urged upwardly by tension coil springs 27E, 28E and 29E depending from an arm 30A extending laterally from the frame 8. The trip levers 27D, 28D and 29D are rockably carried on a shaft 31 and are normally urged by tension coil springs 27F, 28F and 29F respectively into engagement with the masking levers for retaining the later in their depressed positions. The spring 27F is carried by an arm 30B, and the springs 28F and 29F by an arm 30C.

If a shilling is inserted in the apparatus (see FIGURE 11) the masking lever 27A is depressed as indicated by dotted lines, so that its forward end 27C is engaged in a detent 27G in the trip lever 27D, which is moved into such engagement by its spring 27F and the masking lever is held depressed.

If a sixpence is inserted (see FIGURE 13) the masking lever 28A is depressed, as indicated by dotted lines, and held by the trip lever 28D which is moved by the spring 28F into abutment with the forward end 28C of the masking lever, so that the masking lever is held depressed. Operation of the masking lever 29A by a threepenny piece is the same, it being held depressed by the trip lever 29D. (See FIGURE 14).

As any one of the masking levers is depressed it engages and rocks the carriage 26A and so depresses its extension 26B to open the contact 26. The length of time the masking lever is depressed and the contact is open is governed by the trip lever concerned. The three trip levers 27D, 28D and 29D disengage from their respective masking levers at different times. The three penny masking lever 29A is released by its trip lever 29D after one pulse has been transmitted. The trip lever is moved by the pin 21F (FIGURE 8) on the pulsing disc 21A, which pin is positioned to engage the trip lever and move it about shaft 31, to free the masking lever at the correct time. Similarly the pin 21E, projecting from the other side of the pulsing disc, actuates the trip lever 28D after transmission of two pulses to free the sixpence masking lever 28A. The trip lever 27D is actuated by the descending movement of a long pin 32 fixed to the weighted driving arm 12 only after four pulses (corresponding to a shilling) have been transmitted, so that the masking lever 27A is allowed to rise to its normal position.

We claim:

1. A telephone coin collector of the post-payment type comprising a casing, coin slots in the casing, a lever adjacent each coin slot and movable by a coin as it is being inserted, signal pulse producing means to produce different pulse signals for different values of coin and operable by the said levers, locking means for preventing movement of the said levers and thus for preventing coin insertion, release means for said locking means and responsive to a control signal to permit coin insertion when the control signal is received, a drive for the pulse producing means, a weight, a first connection between the weight and the said levers so that the weight is raised when a coin is inserted, and a second connection between the weight and the drive so that when the weight descends the drive is actuated for signal pulse production.

2. A telephone coin collector of the post-payment type comprising a casing, coin slots in the casing, a lever adjacent each coin slot and movable by a coin as it is being inserted, signal pulse producing means to produce different pulse signals for different values of coin and operable by the said levers, locking means for preventing movement of the said levers and thus for preventing coin insertion, release means for said locking means and responsive to a control signal to permit coin insertion when the control signal is received, a drive for the pulse producing means, spring means, a first connection between the spring means and the said levers so that the spring means is energized when a coin is inserted, and a second connection between the spring means and the drive so that when the spring means operates, the drive to the signal pulse producing means is actuated.

3. A coin collector according to claim 1 including means in association with the coin levers for preventing operation of more than one coin lever at a time.

4. A coin collector according to claim 1 wherein the coin levers carry a pivotally mounted carriage, the carriage being liftable by any of the coin levers and the first connection being liftable by the carriage.

5. A coin collector according to claim 1 wherein the first connection includes an arm, the weight being arranged to act on the arm, the drive being a gear train between the arm and the pulse producing means, and a radius arm between the said arm and the gear train.

6. A coin collector according to claim 1 wherein the pulse producing means includes a time controlling device for delimiting the length of time the pulse producing means is operated by the drive, a pulsing shaft connected to the time controlling device, a pulsing disc fixed on the pulsing shaft, and a one-revolution clutch on the pulsing shaft, the said second connection causing the pulsing shaft to rotate once during the said length of time, and the one revolution clutch preventing rotation of the pulsing shaft except during the said length of time.

7. A coin collector according to claim 6 wherein the pulsing disc is operatively associated with a pulsing contact, the periphery of the disc includes means for operating the pulsing contact four times during one revolution of the pulsing disc.

8. A coin collector according to claim 6 including a masking contact and masking means for operating the masking contact, the masking means being set by the coins as they pass through the coin collector and the masking means being adapted to limit the time during which the pulsing contact is in circuit.

9. A coin collector according to claim 8 wherein the masking means includes a lever for each coin value, a trip means operatively associated with each lever, a pivotally mounted carriage movable by any one of the masking levers, and an extension on the carriage for operating the masking contact, a trip means being operable to release its masking lever according to the coin value in question.

10. A coin collector according to claim 3 wherein the said means in association with the coin levers includes a blade member depending vertically from each coin lever and a row of sectors located to receive a blade member between each adjacent pair of sectors, the sectors being so mounted and spaced that a blade-receiving gap may occur between only one pair of sectors at a time.

11. A coin collector according to claim 10 wherein the two outermost sectors are fixed and the other sectors are pivotally mounted and spring urged in one direction about about such pivotal mounting.

12. A coin collector according to claim 1 wherein the release means includes a relay and a lever operable by the relay, which lever is associated with the coin levers for locking or release thereof.

References Cited in the file of this patent

UNITED STATES PATENTS

| | | |
|---|---|---|
| 837,256 | Baird | Nov. 27, 1906 |
| 1,137,399 | Goodrum | Apr. 27, 1915 |
| 2,133,523 | Alexandersson et al. | Oct. 18, 1938 |
| 2,646,866 | Moser | July 28, 1953 |
| 2,670,830 | Hoyt | Mar. 2, 1954 |
| 2,804,502 | Iwema | Aug. 27, 1957 |
| 2,806,084 | Gallagher | Sept. 10, 1957 |
| 2,817,709 | Alexandersson et al. | Dec. 24, 1957 |
| 2,883,463 | Goodale et al. | Apr. 21, 1959 |